United States Patent
Rubino et al.

(10) Patent No.: US 10,403,903 B2
(45) Date of Patent: Sep. 3, 2019

(54) LOW-RATE BATTERY DESIGN

(71) Applicant: Greatbatch Ltd., Clarence, NY (US)

(72) Inventors: Robert S. Rubino, Williamsville, NY (US); Joseph M. Lehnes, Williamsville, NY (US); Ho-Chul Yun, East Amherst, NY (US)

(73) Assignee: Greatbatch Ltd., Clarence, NY (US)

( * ) Notice: Subject to any disclaimer, the term of this patent is extended or adjusted under 35 U.S.C. 154(b) by 137 days.

(21) Appl. No.: 15/620,488

(22) Filed: Jun. 12, 2017

(65) Prior Publication Data

US 2017/0358801 A1 Dec. 14, 2017

Related U.S. Application Data

(60) Provisional application No. 62/348,269, filed on Jun. 10, 2016.

(51) Int. Cl.
| | |
|---|---|
| *H01M 4/38* | (2006.01) |
| *H01M 4/66* | (2006.01) |
| *H01M 4/78* | (2006.01) |
| *H01M 6/16* | (2006.01) |
| *H01M 4/583* | (2010.01) |

(52) U.S. Cl.
CPC ............ *H01M 4/78* (2013.01); *H01M 4/382* (2013.01); *H01M 4/5835* (2013.01); *H01M 4/661* (2013.01); *H01M 6/16* (2013.01)

(58) Field of Classification Search
None
See application file for complete search history.

(56) References Cited

U.S. PATENT DOCUMENTS

| | | |
|---|---|---|
| 5,443,928 A | 8/1995 | Takeuchi et al. |
| 6,432,574 B1 | 8/2002 | Saito et al. |
| 6,596,434 B1 | 7/2003 | Yoshinaka et al. |
| 7,553,584 B2 | 6/2009 | Chiang et al. |
| 7,585,591 B2 | 9/2009 | Mizutani |
| 7,867,655 B2 | 1/2011 | Okabe et al. |
| 8,148,012 B2 | 4/2012 | Okazaki et al. |
| 8,703,314 B2 | 4/2014 | Takai et al. |
| 2003/0077511 A1 | 4/2003 | Mizuno et al. |
| 2006/0240317 A1* | 10/2006 | Phillips ............... H01M 2/1673 429/144 |
| 2007/0117021 A1* | 5/2007 | Frustaci ................. H01M 2/22 429/238 |
| 2009/0246636 A1 | 10/2009 | Chiang et al. |
| 2010/0159337 A1 | 6/2010 | Matsumoto et al. |

(Continued)

*Primary Examiner* — Daniel S Gatewood
(74) *Attorney, Agent, or Firm* — Michael F. Scalise

(57) ABSTRACT

An electrochemical cell comprising a cathode and an anode residing within a casing, the anode being positioned distal of the cathode. The cathode having a cathode current collector having an angled configuration that encourages the cathode active material to move in an axial distal direction during cell discharge. The cathode current collector may be configured having at least one fold thereby dividing the current collector into at least two portions having an angle therebetween. The cathode current collector may comprise a wire having a helical configuration or the cathode current collector may comprise a post with a thread having a helical orientation about the post exterior. A preferred chemistry is a lithium/$CF_x$ activated with a nonaqueous electrolyte.

21 Claims, 7 Drawing Sheets

(56) References Cited

U.S. PATENT DOCUMENTS

| | | |
|---|---|---|
| 2011/0077708 A1 | 3/2011 | Ostroff et al. |
| 2011/0262811 A1 | 10/2011 | Kinoshita et al. |
| 2013/0123875 A1 | 5/2013 | Varady et al. |
| 2013/0316209 A1 | 11/2013 | Masumoto et al. |
| 2014/0113181 A1 | 4/2014 | Bradwell et al. |

* cited by examiner

LOW-RATE BATTERY DESIGN

CROSS-REFERENCE TO RELATED APPLICATION

This application claims priority from U.S. Provisional Application Ser. No. 62/348,269, filed Jun. 10, 2016.

TECHNICAL FIELD

This invention relates to the art of electrochemical cells, and more particularly, to a new and improved electrochemical cell construction that provides for increased energy density. The cell comprises a Group IA anode or negative electrode and a fluorinated carbon ($CF_x$) cathode or positive electrode.

BACKGROUND OF THE INVENTION

Electrochemical cells provide electrical energy that powers a host of electronic devices such as external and implantable medical devices. Among the many medical devices powered by electrochemical cells are leadless pacemakers. Leadless pacemakers are typically cylindrically shaped devices that are inserted into the body through a circular catheter and attached directly to heart tissue. Leadless pacemaker devices contain both the device circuitry and electrical power source in one container. In some embodiments, the electrochemical cell power source may comprise up to 80 percent of the volume of a leadless pacemaker device. In addition, leadless pacemaker devices are designed to operate within the body for an extended period of time, as long as 10 years or more. Thus, it is desirable to provide an electrochemical cell having a reduced size without sacrificing energy capacity of the cell. Such an electrochemical cell having a reduced size with increased energy density would, therefore, enable the development of less invasive miniaturized leadless pacemakers as well as other medical devices that require a relatively small electrical power source with increased capacity.

Prior art electrochemical cells designed to power miniaturized medical devices, such as a leadless pacemaker, are generally of a bobbin-type construction as illustrated in FIG. 3. While bobbin-type electrochemical cell constructions provide reliable discharge characteristics, such constructions are not optimally designed to provide maximum energy density as compared to the electrochemical cell design of the present invention. For example, prior art bobbin-type cell constructions typically comprise a gap between the anode and cathode that extends along the length of the cell. In contrast, the electrochemical cell of the present invention is constructed in a "piston-type" configuration in which the anode/cathode interface is oriented perpendicular to the length of the cell. Such a cell construction of the present invention thus reduces the electrode interfacial area in comparison to a bobbin-type cell construction, which helps to increase the overall energy density of the cell.

In addition, the cathode of cylindrically shaped cells, may radially expand within the casing during discharge. Radial expansion of the cathode is not desired as the expanding cathode can interfere with the intended operation of the cell.

Thus, the electrochemical cell of the present invention is constructed having a cathode current collector of a variety of shapes and configurations designed to minimize radial expansion of the cathode and instead encourage axial expansion of the cathode within the casing.

Thus, as will be discussed in more detail hereinafter, the cathode assembly of the present invention comprises a unique structure that provides a lithium electrochemical cell with increased energy density.

SUMMARY OF THE INVENTION

The present invention provides an electrochemical cell comprising a cathode or positive electrode comprising a solid cathode active material, such as fluorinated carbon, and an anode or negative electrode comprising an active material, such as lithium or $LiC_6$. The cathode and anode are positioned within the casing such that the anode and cathode are adjacent to each other. In comparison to other prior art lithium/fluorinated carbon cells, such as cells of a bobbin-type construction, the structure of the electrochemical cell of the present invention increases energy density. In addition, the electrochemical cell of the present invention is constructed to minimize radial expansion of the cathode during cell discharge.

The electrochemical cell of the present invention is constructed to minimize unoccupied casing volume and minimize utilization of non-electrochemically active materials, such as separator and current collector materials. For example, the electrode assembly is constructed such that the interface between the anode and cathode is oriented perpendicular to the length of the cell. This configuration, therefore, minimizes the interfacial electrode gap in comparison to prior art designs, such as a bobbin-type cell.

In another embodiment, the preferred fluorinated carbon ($CF_x$) cathode active material is formed into a cylindrical shape that is positioned in intimate contact with a cathode current collector that comprises a variety of shapes and configurations. The various cathode and current collector constructions of the present invention increase utilization of internal casing volume and minimize potential radial expansion of the cathode active material. In an embodiment, the current collector of the present invention is constructed having a variety of angled configurations that encourage axial movement of the cathode active material during cell discharge.

In still another embodiment, the cathode current collector is constructed in a folded or corrugated configuration wherein portions of the current collector that lie on opposing sides of a fold are oriented at an angular relationship to one another. In an alternate embodiment, the cathode current collector has a helical cork screw configuration. In either case, the current collector is designed to encourage axial movement of the cathode such that the cathode active material moves towards the anode, therefore minimizing radial expansion of the cathode. Thus, the various configurations of electrochemical cells according to the present invention provide a cell having a reduced volume and increased energy density in comparison to the prior art cells, particularly those of a bobbin-type construction. Furthermore, the increased energy density of an electrochemical cell of the present invention provides for increased cell life.

The electrode assembly is activated with a nonaqueous electrolyte hermetically sealed inside the casing. This makes the present cell particularly useful for powering implantable medical devices of a relatively small size, such as a leadless cardiac pacemaker.

These and other aspects of the present invention will become more apparent to those skilled in the art by reference to the following description and the appended drawings.

DETAILED DESCRIPTION OF THE PREFERRED EMBODIMENTS

Figure 1:
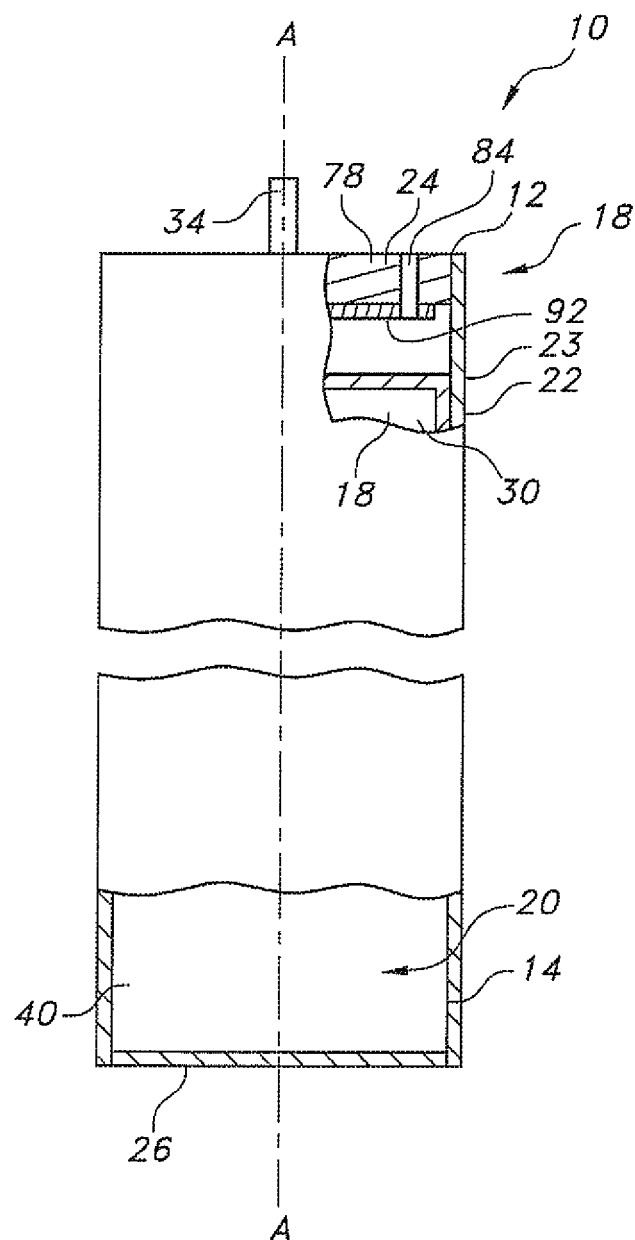
FIG. 1 is a partial cross-sectional view of an embodiment of an electrochemical cell of the present invention in a case negative configuration.
Figure 8:
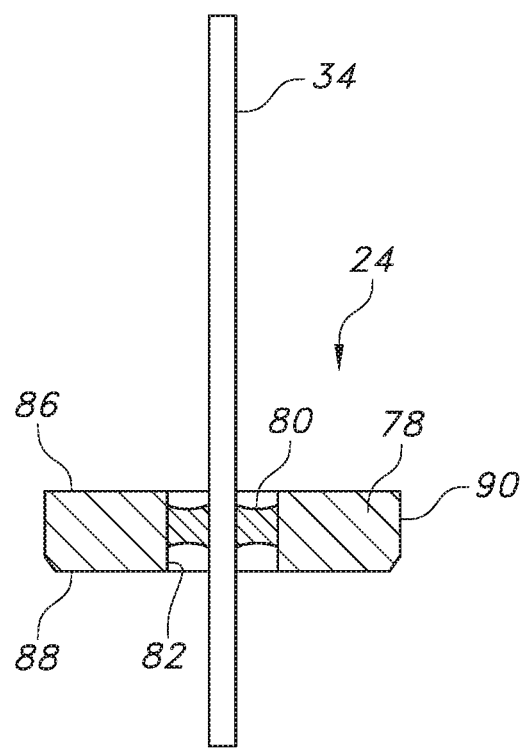
FIG. 8 shows an embodiment of a header assembly comprising a terminal pin supported in a lid by a glass to metal seal.

Referring now to the drawings, FIG. 1 is a partial cross-sectional view of an embodiment of an electrochemical cell 10 according to the present invention. An imaginary axis A-A extends longitudinally through the cell 10 comprising a casing 22 having a sidewall 23 extending from a proximal open end 12 to a casing distal end 14. The cell comprises an electrode assembly 16 including a cathode or positive electrode 18 and an anode or negative electrode 20 housed inside the casing 22 made of metal, such as stainless steel, titanium, nickel, aluminum, or other suitable electrically conductive material. The casing 22 preferably comprises a cylindrically shaped container that has a significantly longer length than diameter (perpendicular to the axis A-A). In other words, the casing 22 has an aspect ratio of its length to its diameter (perpendicular to its length along axis A-A) that ranges from about 2:1 to about 6:1. The casing 22 is closed at the proximal open end 12 by a header assembly 24 (FIG. 8). The distal end 14 has an end wall 26. A separator 28 is positioned between the anode 20 and cathode 18.

Preferably, the cell 10 is built in a case negative design with the casing 22 serving as the anode terminal. In addition, the cathode 18 includes a cathode active material 30 that is in electrical contact with a cathode current collector. The cathode current collector is electrically connected to a terminal pin 34 that exits the cell 10 through the header assembly 24.

Figure 4:
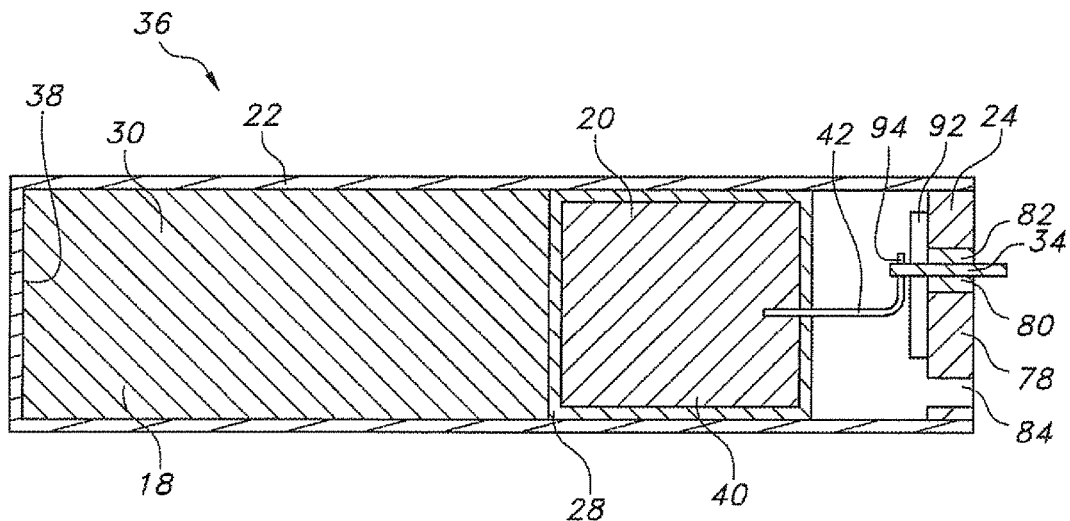
FIG. 4 shows a cross-sectional view of an embodiment of an electrochemical cell of the present invention in a case positive configuration.
Figure 5A:
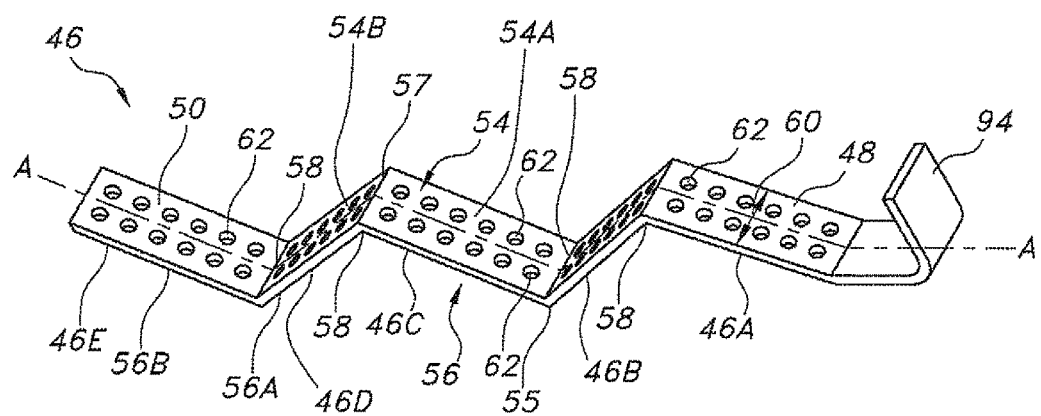
FIG. 5A shows an enlarged perspective view of an embodiment of a current collector that may be utilized in the electrochemical cell of the present invention.
Figure 5B:
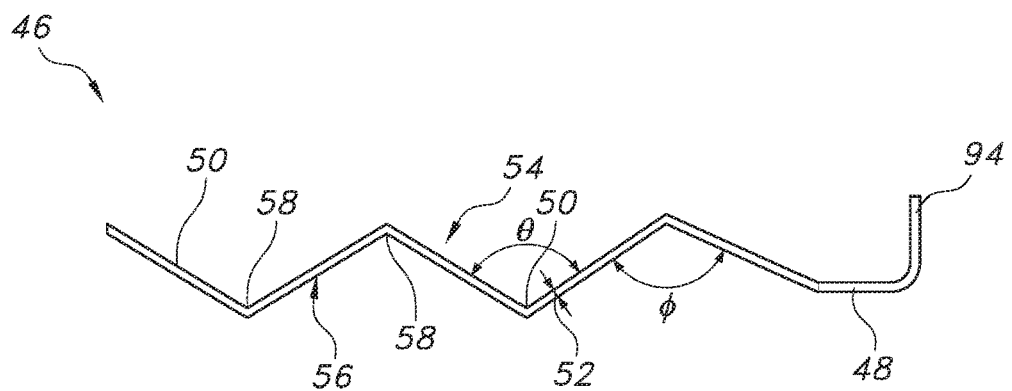
FIG. 5B illustrates an enlarged side view of the embodiment of the current collector shown in FIG. 5A that may be utilized in the electrochemical cell of the present invention.
Figure 5C:
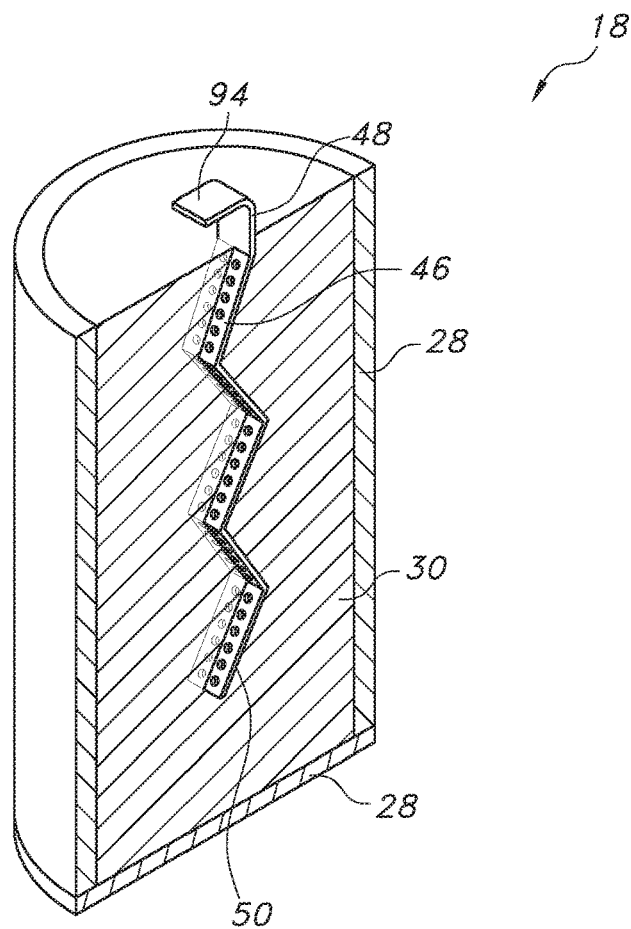
FIG. 5C illustrates the embodiment of the current collector shown in FIG. 5A positioned within an electrode, the electrode being partially enveloped in a separator 28.

FIG. 4 illustrates an embodiment of a cell 36 in a case positive configuration. In that respect, the electrode shown in FIG. 4 is constructed such that the casing 22 serves as the cathode terminal with the cathode active material 30 in electrical contact with an interior surface 38 of the casing 22. The anode 20 comprises an anode active material 40 supported by an anode current collector 42 electrically connected to the terminal pin 34. Both the case-negative and case-positive electrode designs are well known by those skilled in the art.

Figure 2:
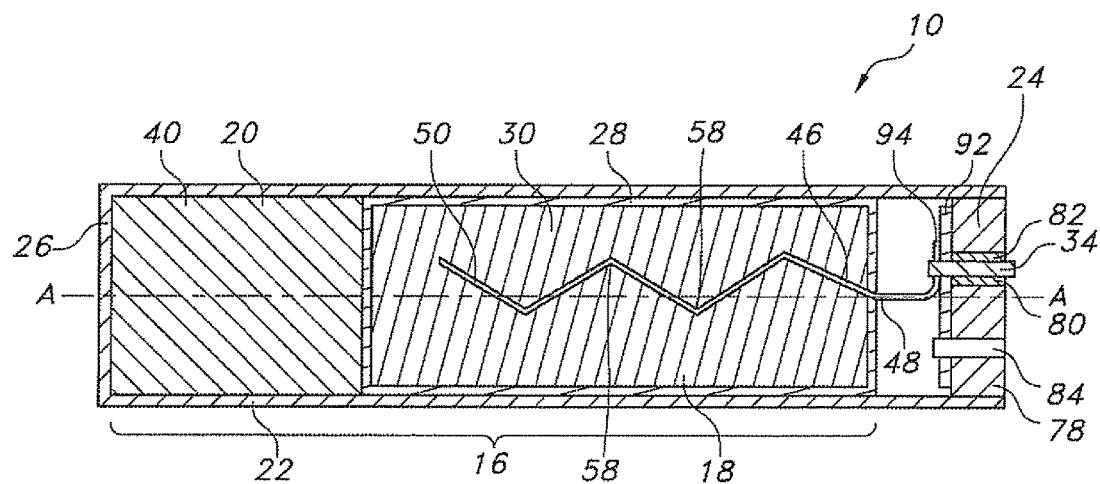
FIG. 2 is a cross-sectional view of the embodiment of the electrochemical cell shown in FIG. 1.

In an embodiment, the anode 20 is positioned within the casing 22 distal the cathode 18 in the case-negative cell 10 design of the present invention. As shown in FIGS. 1 and 2, the anode 20 is preferably positioned within the casing 22 at the distal end 14 such that the anode 20 is adjacent to the cathode 18, the separator 28 positioned therebetween. This preferred electrode assembly 16 configuration is designed to maximize energy density by minimizing unoccupied internal casing volume. In a preferred embodiment, the electrode assembly 16 of the present invention is configured such that when the cell is discharged, the cathode 18 expands in an axial direction along axis A-A and towards the cell distal end 14 as the anode 20 chemically reacts with the cathode 18.

Figure 3:
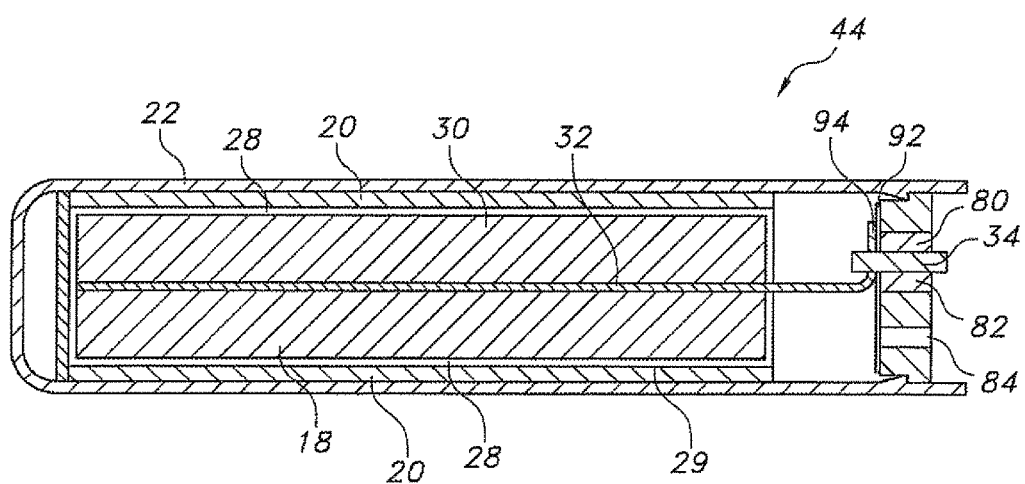
FIG. 3 is a cross-sectional view of an embodiment of a prior art bobbin-type electrochemical cell.

A prior art cell 44 of a bobbin-type construction is shown in the cross-sectional view of FIG. 3. As shown, unlike the construction of the electrode assembly 16 of the cell 10 of the present invention, the anode 20 of the prior art cell 44 is wrapped circumferentially around the cathode 18 supported by a current collector 32 that extends lengthwise from the proximal end to the distal end of the casing. To prevent the opposite polarity electrodes from physically contacting each other, a separator 28 is positioned between the anode 20 and cathode 30. Thus, an interfacial gap 29 extends along the length of the anode 20 facing the cathode 18. The interfacial gap 29 in a bobbin-type cell increases the amount of unoccupied casing volume. Thus, prior art bobbin-type cells 44 are generally not ideally constructed for maximizing energy density, particularly prior art cells having a relatively narrow cylindrical shape or narrow aspect ratio of width to length.

In addition, cylindrically shaped cathodes may expand in a radial direction during discharge as the cathode electrochemically reacts with the anode. Radial expansion of the cathode in a cylindrically shaped cell is generally not desired as the cathode active material may cause undesirable mechanical pressure on the interior casing surface.

Furthermore, since radial expansion of the cathode within some cylindrically shaped cell configurations is taken into account during cell design, miniaturization of the cell is generally limited because the diameter of the cylindrically shaped casing is designed to accommodate for radial expansion of the cathode.

In contrast to the design of the bobbin-type prior art cell 44 shown in FIG. 3, the cells 10, 36 of the present invention are configured for increased utilization of internal casing volume, which provides for increased energy density. In particular, the cell 10 of the present invention is designed to minimize unoccupied internal casing volume and minimize use of non-electrochemically active materials, such as separator and current collector materials. As illustrated in FIGS. 1 and 2, unlike the prior art cell 44, the anode active material 40 of the cell 10 of the present invention resides at the cell distal end 14 such that the anode active material 40 is positioned in direct contact with the internal surface of the casing end wall 26. In addition, the interface between the anode 20 and cathode 18 is oriented perpendicular to the cell length along longitudinal axis A-A. Thus, the design of the cell 10, 36 of the present invention maximizes utilization of internal cell volume.

Referring to FIG. 3, the separator 28 of the prior art cell 44 extends along the axial length of anode/cathode assembly. Furthermore, the current collector of the prior art design extends along the axial length of the cathode/anode assembly within the cathode active material. For example, given the same length, the cell 10 of the present invention utilizes less separator and current collector materials as compared to the prior art bobbin-type cell 44 (FIG. 3). Since the cell 10 of the present invention is constructed with the anode 20 and cathode 18 positioned adjacent to each other, the separator 28 and current collector of the cell 10 of the present invention extend only a partial distance of the cell length along longitudinal axis A-A.

In addition to maximizing utilization of internal casing volume, the electrochemical cell 10 of the present invention comprises a cathode current collector 46 having an angled configuration. In a preferred embodiment, the cathode current collector 46 having the preferred angled configuration is designed to minimize radial expansion and provide for axial movement of the cathode active material 30 along the imaginary axis A-A in a distal direction within the cell casing 22 during discharge. It is noted that the cathode current collector may be formed into a variety of non-limiting angled configurations.

FIGS. 2, 5A, 5B, and 5C illustrate an embodiment of the cathode current collector 46 having a preferred angular configuration. As shown, the cathode current collector 46 extends from a current collector proximal end 48 along imaginary longitudinal axis A-A to a current collector distal end 50. The current collector comprises a thickness 52 (FIG. 5B) that extends between opposed top and bottom surfaces 54, 56. In the embodiment shown, a plurality of spaced apart folds or creases 58 extend along a width 60 of the current collector 46. In an embodiment, the folds 58 extend about perpendicular to the longitudinal axis A-A across the current collector width 60.

As illustrated, the current collector 46 is oriented such that adjacent top surfaces 54, for example surfaces 54A and 54B, or adjacent bottom surfaces 56, for example surfaces 56A and 56B, that reside on opposing sides of a respective fold or crease 58 are oriented at an angular relationship with respect to each other. In an embodiment, a top fold angle θ extends between adjacent top surfaces 54A, 54B that reside on opposite sides of the fold 58. A bottom fold angle ϕ extends between adjacent bottom surfaces 56A, 56B that reside on opposite sides of a fold or crease 58. In an embodiment the top fold angle θ or the bottom fold angle ϕ may be obtuse angles. In a preferred embodiment, the top fold angle θ or the bottom fold angle ϕ may range from about 100° to about 170°. Moreover, there is at least two folds at spaced locations along the length of the current collector. The embodiment shown in FIG. 5A has five folds, but that should not be seen as limiting. According to the scope of the present invention, the current collector 46 can have up to 100 folds or more in a corrugated construction of alternate furrows 55 and ridges 57 to thereby provide the current collector having adjacent, but connected angled current collector portions 46A to 46E.

In an embodiment, the cathode current collector is designed to flex in an axial direction along the longitudinal axis A-A within the casing during cell discharge. As such, the thickness 52 of the cathode current collector 46 is designed to be relatively thin and flexible having a thickness ranging from about 0.0025 cm to about 0.25 cm. This preferred thickness is designed to promote flexure of the current collector 46 during operation of the cell 10. During cell discharge, the folded configuration of the current collector 46 is designed to relax thereby extending the current collector distal end 50 in a distal direction within the cell 10 thus encouraging axial movement of the cathode within the cell 10. In an embodiment, the current collector 46 of the present invention may comprise a plurality of perforations 62 that extend through the current collector thickness 52. These perforations 62 are designed to aid in adhesion of the cathode active material 30 to the surface of the current collector 46. In a further embodiment, the current collector 46 may be composed of a flexible metal comprising a grid foil structure, such as the Microgrid® expansion metal made by Dexmet® of South Wallingford Conn. In an embodiment, the flexible metal comprising the grid foil structure is designed to expand during cell discharge thereby moving the cathode active material 30 in an axial direction towards the anode active material 40.

In an embodiment, the cathode current collector 46 shown in FIGS. 2, 5A, 5B, and 5C may be incorporated within the cathode 18 by pressing the cathode active material 30 to at least one of the top and bottom surfaces 54, 56 of the current collector 46. In an embodiment, an amount of pressure adequate to adhere the cathode active material 30 to the current collector surface 54, 56 while minimizing distortion of the angular relationship of the folds 58 is preferred. Thus, the preferred angular configuration of the current collector 46 remains intact within the cathode active material 30.

Figure 6A:
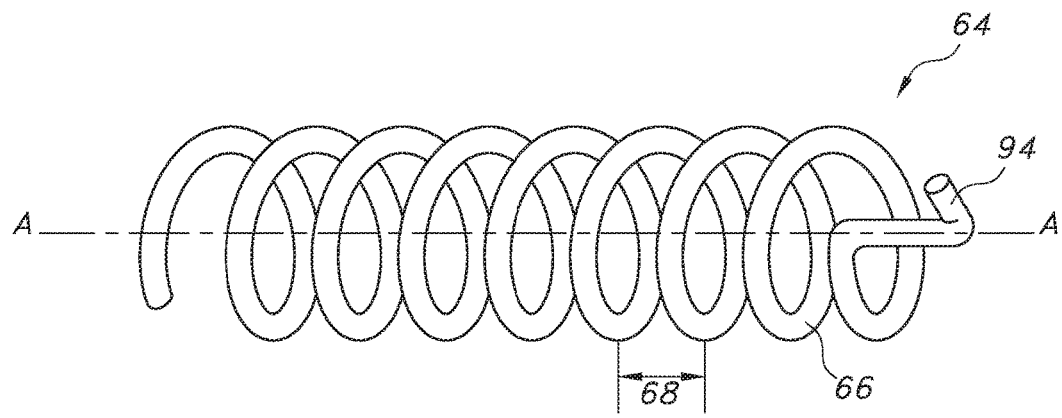
FIG. 6A shows an enlarged perspective view of an embodiment of a current collector that may be utilized in the electrochemical cell of the present invention.
Figure 6B:
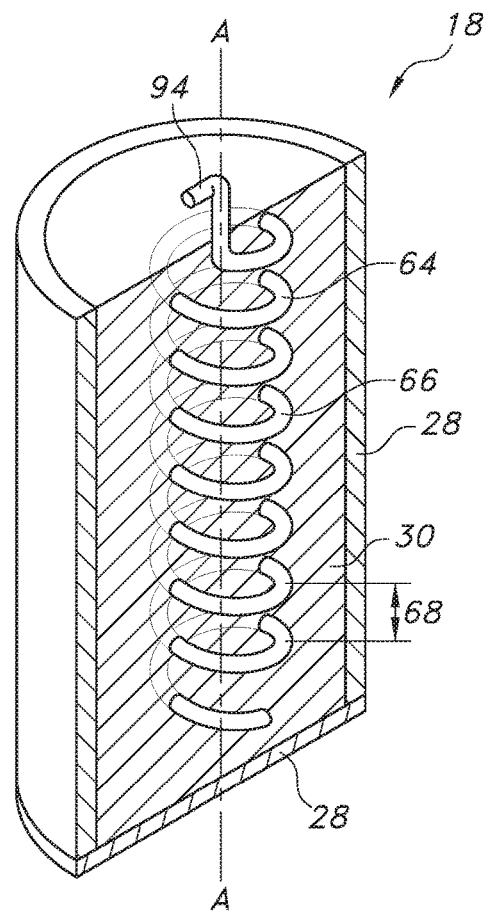
FIG. 6B illustrates the embodiment of the current collector shown in FIG. 6A positioned within an electrode, the electrode being partially enveloped in a separator 28.

FIG. 6A illustrates an alternate embodiment of a cathode current collector 64 that may be incorporated within a cathode 18. FIG. 6B illustrates the alternate cathode current collector 64 embodiment incorporated within a cathode 18 of the cell 10 of the present invention. As shown, the cathode current collector 64 comprises a wire 66 configured in a helical orientation. In an embodiment, the wire 66 comprises a diameter that ranges from about 0.001 cm to about 0.010 cm. In addition, the current collector 64 may be configured with a helical pitch 68 that ranges from about 0.1 cm to about 5 cm. As defined herein, "helical pitch" is the length of one complete helix turn. In an embodiment, the helically configured current collector 64 may have a diameter spanning between opposing sides of the helix that ranges from about 0.01 cm to about 2.0 cm.

Figure 7A:
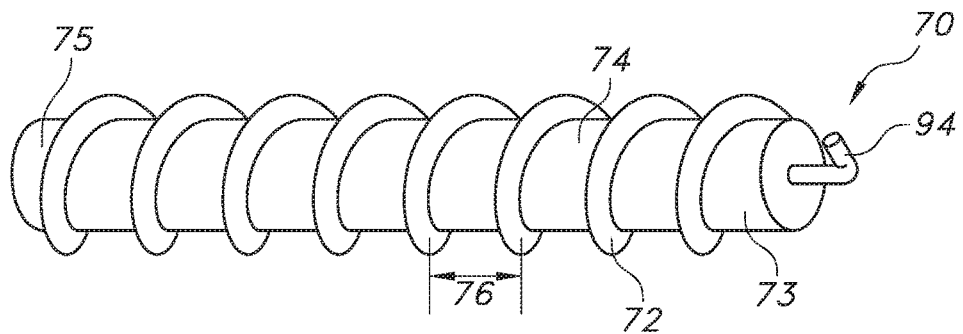
FIG. 7A shows an enlarged perspective view of an embodiment of a current collector that may be utilized in the electrochemical cell of the present invention.
Figure 7B:
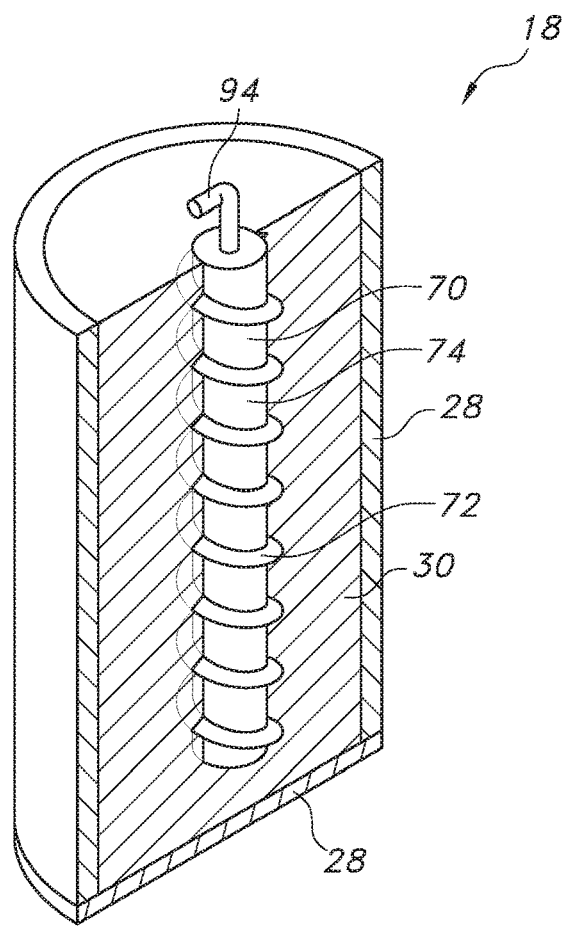
FIG. 7B illustrates the embodiment of the current collector shown in FIG. 7A positioned within an electrode, the electrode being partially enveloped in a separator 28.

FIG. 7A illustrates another embodiment of a cathode current collector 70 that may be incorporated within a cathode 18. FIG. 7B illustrates the alternate cathode current collector 70 embodiment incorporated within a cathode 18 of the cell 10 of the present invention. As illustrated, the cathode current collector 70 is of a screw configuration comprising a thread 72 that extends outwardly from a post 74. As shown, the thread 72 is oriented in a helical orientation about the post 74 from a post proximal end 73 to a post distal end 75. In addition, the thread 72 of the current collector 70 may be configured with a helical pitch 76 that ranges from about 0.1 cm to about 5 cm. In an embodiment, the post 74 and thread 72 of the cathode current collector 70 may be constructed such that they are of a uniform construction. Alternatively, the cathode current collector 70 may be constructed such that the thread 72 is joined to the post 74. In an embodiment, the thread 72 and post 74 are made from electrically conductive materials, that includes but are not limited to, metals such as titanium, carbon coated titanium, tantalum, platinum, gold, aluminum, cobalt nickel alloys, highly alloyed ferritic stainless steel containing molybdenum and chromium, and nickel-, chromium- and molybdenum-containing alloys.

In an embodiment, the helically shaped current collectors 64, 70 shown in FIGS. 6A and 7A may be inserted into pressed cathode active material 30 by rotating the helically configured wire 66 or thread 72 of the current collector 64, 70 into the material. Alternatively, a pilot hole (not shown), may be at least partially formed within the cathode active material 30 prior to insertion of the helically shaped current collectors 64, 70. In an embodiment, the helically shaped current collectors 64, 70 shown in FIGS. 6A and 7A are configured such that the helically oriented wire 66 or thread 72 may be left or right-handed. In either case, the helical configuration of the wire 66 or thread 72 is configured such that as the cathode expands, the cathode active material travels in a helical direction towards the cell distal end 14.

In an embodiment, the anode and cathode current collectors 42, 46, 64, and 70 may be composed of a variety of metals including, but not limited to, titanium, carbon coated titanium, tantalum, platinum, gold, aluminum, cobalt nickel alloys, highly alloyed ferritic stainless steel containing molybdenum and chromium, and nickel-, chromium- and molybdenum-containing alloys, the former being preferred. The cathode active material is preferably carbon or fluorinated carbon, $CF_x$.

Referring now to FIGS. 1, 2, and 4, both the case negative and case positive cell designs are constructed with the header assembly 24 (FIG. 8), as previously discussed. The header assembly 24 comprises an upper lid 78 supporting a glass material 80 sealing between a lid opening 82 and the terminal pin 34. The terminal pin 34 is composed of molybdenum, titanium, aluminum, nickel alloy, or stainless steel, the former being preferred. The sealing glass 80 is of a corrosion resistant type having up to about 50% by weight silicon such as CABAL 12, TA 23 or FUSITE 425 or FUSITE 435. This structure is commonly referred to as a glass-to-metal seal (GTMS). In addition, an electrolyte fill opening 84 (FIG. 1) extends through the upper lid 78 and provides for the filling an electrolyte (not shown) into the casing 22 for activating the cell 10. A fill plug (not shown) is then fitted into the fill opening 84 in the upper lid 78 and sealed therein such as by laser welding to hermetically seal the cell.

The upper lid 78 is preferably a disc-shaped member of the same material as the casing and comprises an upper lid surface 86 and a lower surface 88 extending to a cylindrical sidewall 90. The lid 78 is in a snug fitting relationship with the proximal open end 12 of the casing 22. In that position, the upper lid surface 86 is coplanar with the proximal end of the casing sidewall 23.

As shown in FIG. 1, an electrical insulator 92, such as a polymer, is supported on the terminal pin 34, seated against the lower lid surface 88. In this position, the outer surrounding edge of the insulator 92 meets the lower edge of the lid. The insulator 92 helps minimize the potential of creating an electrical short circuit within the cell by electrically insulating the cathode and its cathode current collector from the casing 22. It also minimizes potential corrosion of the sealing glass 80 by the electrolyte. As shown, the terminal pin 34 is joined to a proximal tab portion 94 of the cathode current collector 46, 64, and 70, such as by a resistance or laser weld thereto to connect the header assembly 24 to the cathode 18 (FIG. 2).

In an embodiment, the cathode 18 in the case negative cell configuration 10 is enveloped in an ionically porous polymeric material serving as the separator 28 (FIG. 2). The separator envelope is made discontinuous at the proximal end, but not at the distal end. In the case positive configuration, the separator 28 is positioned between the anode active material 40 and the cathode active material 30 as shown in FIG. 4. In an embodiment, the separator 28 may envelop the anode 40 in the case positive configuration. Non-limiting illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

Those skilled in the art will readily recognize that the cell of the present invention can also be readily adapted to primary electrochemical systems of a liquid cathode type, or a secondary cell such as a lithium ion cell having a carbonaceous negative electrode and lithium cobalt oxide positive electrode.

By way of example, in an illustrative primary cell, the anode is of an alkali metal, preferably lithium, contacted to a nickel, copper or stainless steel current collector. The preferred cathode active material is $CF_x$. This electrochemical couple is preferably activated with an electrolyte that can be a 1.0M to 1.4M solution of $BF_4$, $LiAsF_6$ or $LiPF_6$ in γ-butyrolactone.

In the secondary electrochemical cell, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glass carbon, etc.), which are capable of reversibly retaining the lithium species, is preferred for the anode material. A material that is suitable for the present invention is described in U.S. Pat. No. 5,443,928 to Takeuchi et al., which is assigned to the assignee of the present invention and incorporated herein by reference. Graphite is another preferred material. Regardless the form of the carbon, fibers of the carbonaceous material are particularly advantageous because they have excellent mechanical properties that permit them to be fabricated into rigid electrodes capable of withstanding degradation during repeated charge/discharge cycling. Moreover, the high surface area of carbon fibers allows for rapid charge/discharge rates.

Also in secondary systems, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, and $LiNi_xCO_yMn_{(1-y)}O_2$.

An electrolyte is also required to activate the anode/cathode combination in the secondary system. The composition of the electrolyte depends on the materials of construction of the anode and the cathode as well as the product application for the cell. A preferred electrolyte for a lithium ion secondary cell has a lithium salt dissolved in a solvent system of dimethyl carbonate, diethyl carbonate, ethyl methyl carbonate and propylene carbonate.

It is appreciated that various modifications to the inventive concepts described herein may be apparent to those of

What is claimed is:

1. An electrochemical cell, comprising:
   a) a casing, comprising:
      i) a container having an interior surface extending to a container open end; and
      ii) a header assembly closing the container open end;
   b) a first electrode, comprising:
      i) a current collector, comprising:
         A) a width extending to a current collector first edge and a current collector second edge, the current collector first and second edges extending to a current collector proximal end and to a current collector distal end; and
         B) at least one fold extending laterally across the width to the current collector first and second edges to thereby provide a current collector proximal portion delineated by the fold from a current collector distal portion, wherein a fold angle resides between the current collector proximal and distal portions, and
         C) wherein the current collector is configured so that during cell discharge the fold angle increases so that the current collector proximal and distal portions are closer to being aligned an imaginary plane than they are prior to cell discharge; and
      ii) a first active material contacted to the current collector;
   c) a second electrode, comprising
      a second active material positioned within the casing spaced from the first electrode, wherein at least a portion of the second active material is in electrical contact with the interior casing surface;
   d) a terminal pin supported in the header assembly by a glass-to-metal seal and being joined to the current collector proximal end;
   e) a separator positioned between the first electrode and the second electrode housed inside the casing; and
   f) an electrolyte activating the first and second electrodes housed inside the casing.

2. The electrochemical cell of claim 1, wherein the at least one fold is oriented substantially perpendicular to the current collector first and second edges.

3. The electrochemical cell of claim 1, wherein the current collector has at least two folds that are substantially parallel to each other.

4. The electrochemical cell of claim 1, wherein, prior to cell discharge, the fold angle between the proximal and distal current collector portions ranges from about 100° to about 170°.

5. The electrochemical cell of claim 1, wherein the current collector has a thickness that ranges from about 0.0025 cm to about 0.25 cm.

6. The electrochemical cell of claim 1, wherein at least one perforation extends through the current collector.

7. The electrochemical cell of claim 1, wherein the first active material comprises carbon or fluorinated carbon and the second active material comprises lithium, or wherein the first active material comprises lithium and the second active material comprises carbon or fluorinated carbon.

8. The electrochemical cell of claim 1, wherein the current collector is composed of a metal selected from the group consisting of titanium, carbon coated titanium, tantalum, platinum, gold, aluminum, cobalt nickel alloys, highly alloyed ferritic stainless steel containing molybdenum and chromium, a nickel containing alloy, a chromium containing alloy, a molybdenum containing alloy, and combinations thereof.

9. An electrochemical cell, comprising:
   a) a casing, comprising:
      i) a container having an interior surface extending to a container proximal open end and a container distal open end;
      ii) a header assembly closing the container proximal open end; and
      iii) an end wall closing the container distal open end;
   b) a first electrode, comprising:
      i) a current collector, comprising:
         A) a width extending to a current collector first edge and a current collector second edge, the current collector first and second edges extending to a current collector proximal end and a current collector distal end; and
         B) at least one fold extending laterally across the width to the current collector first and second edges to thereby provide a current collector proximal portion delineated by the fold from a current collector distal portion, wherein a fold angle resides between the current collector proximal and distal portions, and
         C) wherein the current collector has a thickness that ranges from about 0.0025 cm to about 0.25 cm; and
      ii) a first active material contacted to the current collector;
   c) a second electrode comprising a second active material positioned within the casing spaced from the first electrode, wherein at least a portion of the second active material is in electrical contact with the interior casing surface;
   d) a terminal pin supported in the header assembly by a glass-to-metal seal and being joined to the current collector proximal end;
   e) a separator positioned between the first and second electrodes; and
   f) an electrolyte activating the first and second electrodes housed inside the casing.

10. The electrochemical cell of claim 9, wherein the at least one fold is oriented substantially perpendicular to the current collector first and second edges.

11. The electrochemical cell of claim 9, wherein, prior to cell discharge, the fold angle between the proximal and distal current collector portions ranges from about 100° to about 170°.

12. The electrochemical cell of claim 9, wherein at least one perforation extends through the current collector.

13. The electrochemical cell of claim 9, wherein the first active material comprises carbon or fluorinated carbon and the second active material comprises lithium, or wherein the first active material comprises lithium and the second active material comprises carbon or fluorinated carbon.

14. The electrochemical cell of claim 9, wherein the current collector is composed of a metal selected from the group consisting of titanium, carbon coated titanium, tantalum, platinum, gold, aluminum, cobalt nickel alloys, highly alloyed ferritic stainless steel containing molybdenum and chromium, a nickel containing alloy, a chromium containing alloy, a molybdenum containing alloy, and combinations thereof.

15. The electrochemical cell of claim 9, wherein the current collector has at least two folds that are substantially parallel to each other.

16. An electrochemical cell, comprising:
a) a casing, comprising:
   i) a container having an interior surface extending to a container open end; and
   ii) a header assembly closing the container open end;
b) a first electrode, comprising:
   i) a current collector, comprising:
      A) a width extending to a current collector first edge and a current collector second edge, the current collector first and second edges extending to a current collector proximal end and a current collector distal end; and
      B) at least one fold extending laterally across the width to the current collector first and second edges to thereby provide a current collector proximal portion delineated by the fold from a current collector distal portion, wherein a fold angle resides between the current collector proximal and distal portions, and
      C) wherein the current collector first and second edges in both the current collector proximal and distal portions reside in respective first and second imaginary planes; and
   ii) a first active material contacted to the current collector;
c) a second electrode comprising a second active material positioned within the casing spaced from the first electrode, wherein at least a portion of the second active material is in electrical contact with the interior casing surface;
d) a terminal pin supported in the header assembly by a glass-to-metal seal and joined being to the current collector proximal end;
e) a separator positioned between the first and second electrodes; and
f) an electrolyte activating the first and second electrodes housed inside the casing.

17. The electrochemical cell of claim 16, wherein the at least one fold is oriented substantially perpendicular to the first and second imaginary planes of the respective current collector first and second edges.

18. The electrochemical cell of claim 16, wherein, prior to cell discharge, the fold angle between the proximal and distal current collector portions ranges from about 100° to about 170°.

19. The electrochemical cell of claim 16, wherein the current collector has a thickness that ranges from about 0.0025 cm to about 0.25 cm.

20. The electrochemical cell of claim 16, wherein at least one perforation extends through the current collector.

21. The electrochemical cell of claim 16, wherein the current collector has at least two folds that are substantially parallel to each other.

* * * * *